United States Patent
Black

(10) Patent No.: US 9,444,985 B2
(45) Date of Patent: Sep. 13, 2016

(54) REDUCED HEIGHT CAMERA MODULES

(71) Applicant: Semiconductor Components Industries, LLC, Phoenix, AZ (US)

(72) Inventor: Robert A. Black, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 12 days.

(21) Appl. No.: 13/874,872

(22) Filed: May 1, 2013

(65) Prior Publication Data

US 2013/0308026 A1    Nov. 21, 2013

Related U.S. Application Data

(60) Provisional application No. 61/642,422, filed on May 3, 2012.

(51) Int. Cl.
*H04N 5/225*    (2006.01)
*H04N 5/335*    (2011.01)
*H04N 5/369*    (2011.01)

(52) U.S. Cl.
CPC ............ *H04N 5/2254* (2013.01); *H04N 5/335* (2013.01); *H04N 5/3696* (2013.01); *H04N 5/2257* (2013.01)

(58) Field of Classification Search
CPC .. H04N 5/2254; H04N 5/2257; H04N 5/335; H04N 5/3696
See application file for complete search history.

(56) References Cited

U.S. PATENT DOCUMENTS

| | | | |
|---|---|---|---|
| 7,729,061 B2 | 6/2010 | Vinogradov | |
| 2004/0228004 A1* | 11/2004 | Sercel | B23K 26/0608 359/668 |
| 2005/0128335 A1* | 6/2005 | Kolehmainen | G02B 13/0015 348/340 |
| 2006/0044450 A1* | 3/2006 | Wolterink | G02B 13/006 348/340 |
| 2006/0273239 A1 | 12/2006 | McGrath et al. | |
| 2008/0204887 A1* | 8/2008 | Kaluzhny | H01L 27/14627 359/620 |
| 2009/0015694 A1* | 1/2009 | Saito | G02B 15/173 348/240.99 |
| 2010/0103540 A1* | 4/2010 | An | G02B 7/021 359/819 |
| 2010/0253799 A1* | 10/2010 | Mabuchi | H01L 27/14621 348/222.1 |
| 2010/0309665 A1* | 12/2010 | Young | F21V 5/002 362/235 |
| 2011/0187903 A1* | 8/2011 | Kim | H04N 5/217 348/241 |
| 2012/0044391 A1* | 2/2012 | Ni | H04N 5/3572 348/242 |
| 2012/0092480 A1* | 4/2012 | Putman | H04N 5/349 348/79 |
| 2012/0147238 A1* | 6/2012 | Kita | H04N 5/23212 348/302 |
| 2014/0036115 A1* | 2/2014 | Mabuchi | H01L 27/14621 348/254 |

* cited by examiner

*Primary Examiner* — Lin Ye
*Assistant Examiner* — John H Morehead, III
(74) *Attorney, Agent, or Firm* — Treyz Law Group, P.C.; Vineet Dixit; Joseph F. Guihan

(57) ABSTRACT

Electronic devices may include camera modules. A camera module may include an anamorphic lens and an image sensor having an array of asymmetrical image pixels. The array may be a square array arranged in pixel columns and pixel rows. The square image pixel array may include more pixel columns than pixel rows and may be located completely within the image circle of the anamorphic lens. The asymmetrical image pixels may each have a width that is smaller the height of that image pixel. The asymmetrical image pixels may be rectangular image pixels or diamond-shaped image pixels. The anamorphic lens may project a distorted image onto the array of asymmetrical image pixels. The width of each asymmetrical image pixel may be smaller than the height of that image pixel by an amount that corresponds to the distortion of the image by the anamorphic lens.

13 Claims, 5 Drawing Sheets

REDUCED HEIGHT CAMERA MODULES

This application claims the benefit of provisional patent application No. 61/642,422, filed May 3, 2012, which is hereby incorporated by reference herein in its entirety.

BACKGROUND

This relates generally to imaging devices, and more particularly, to imaging devices with anamorphic lenses and asymmetrical image pixels.

Camera modules having image sensors and lenses are commonly used in electronic devices such as cellular telephones, cameras, and computers to capture images. In a typical arrangement, an electronic device is provided with an image sensor with an array of square image pixels arranged in pixel rows and pixel columns. A lens is used to focus image light onto the image sensor. The lens must illuminate the full image sensor for a given field-of-view. In other words, an image sensor is placed at a distance from the lens such that the image circle of the lens at the location of the image sensor is large enough that the full image pixel array fits within the image circle. For this reason, the z-height of the camera module is limited by the largest diagonal dimension of the image sensor.

Image sensors commonly include image pixel arrays with more pixel columns than pixel rows. For example, standard image sensors include either four pixel columns for every three pixel rows for still image capture sensors or sixteen pixel columns for every nine pixel rows for video image capture sensors. Conventional camera modules using these types of configurations therefore have an increased z-height in order to locate the image sensor at a location at which all of the pixel columns fit within the image circle of the lens.

It would therefore be desirable to be able to provide improved camera modules with reduced z-heights that generate standardized still and video image output.

DETAILED DESCRIPTION

Camera modules are widely used in electronic devices such as digital cameras, computers, cellular telephones, and other electronic devices. These electronic devices may include image sensors that gather incoming light to capture an image. The image sensors may include arrays of image pixels. The pixels in the image sensors may include photosensitive elements such as photodiodes that convert the incoming light into digital data. Image sensors may have any number of pixels (e.g., hundreds or thousands or more). A typical image sensor may, for example, have hundreds, thousands, or millions of pixels (e.g., megapixels).

Figure 1:
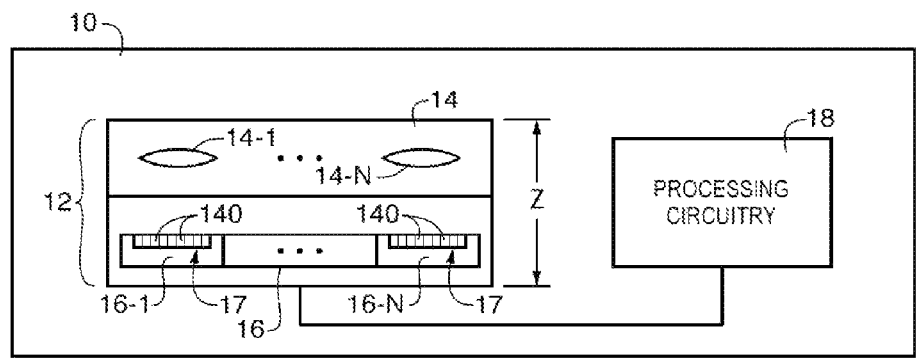
FIG. 1 is a diagram of an illustrative electronic device that contains a camera module with anamorphic lenses and asymmetrical image pixels in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more anamorphic lenses such as lenses 14-1 and 14-N and one or more corresponding image sensors such as image sensors 16-1 and 16-N. During image rapture operations, light from a scene may be focused onto one or more image pixel arrays 17 of image sensors 16-1 . . . 16-N using respective anamorphic lenses 14-1 . . . 14-N. Lens array 14 and image sensor array 16 may be mounted in a common package and may provide image data to processing circuitry 18.

Each image sensor image include one or more arrays 17 of image pixels 140. Image pixels 140 of each image pixel array may have an asymmetrical shape that corresponds to distortion of an image of a scene by lenses in array 14. For example, lens 14-1 may be an anamorphic lens that projects image light from a portion of a scene that is wider than it is tall onto a square image pixel array 17. That is, anamorphic lens 14-1 may compress the horizontal dimension of the image. Image pixels 140 in image sensor 16-1 may have a width that is smaller than their height so that the compression ratio of lens 14-1 is matched by the dimensions of pixels 140. In this way, a relatively wide scene can be projected onto a square image pixel array while projecting light from square portions of the scene into single asymmetrical image pixels using the anamorphic lens. This type of square image pixel array having asymmetrical image pixels may be placed closer to a lens than as conventional image sensor using a standard lens. The total z-height Z of camera module 12 may therefore be reduced in comparison with conventional camera modules.

A properly dimensioned (undistorted) image of the scene can be generated by reading out image signals from asymmetrical image pixels 140 into corresponding square output image pixels, thereby generating a relatively wide image of the scene that corresponds to the relatively wide field-of-view of camera module 12.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensor array 16 or an integrated circuit within module 12 that is associated with image sensor array 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

There may be any suitable number of lenses in lens array 14 and an suitable number of image sensors in image sensor array 16. Lens array 14 may, as an example, include N*M individual anamorphic lenses arranged in an N×M two-dimensional array. The values of N and M may be equal to one, equal or greater than two, may be equal to or greater than three, may exceed 10, or may have any other suitable values. Image sensor array 16 may contain a corresponding N×M two-dimensional array of individual image sensors having arrays of asymmetrical image pixels. The image sensors may be formed on one or more separate semiconductor substrates. With one suitable arrangement, which is sometimes described herein as an example, the image sensors are formed on a common semiconductor substrate (e.g., a common silicon image sensor integrated circuit die). Each image sensor may be identical or there may be different types of image sensors in a given image sensor array integrated circuit. Each image sensor may be a Video Graphics Array (VGA) sensor with a resolution of 480×640 sensor pixels (as an example). Other types of sensor pixels may also be used for the image sensors if desired. For example, images sensors with greater than VGA resolution sensor (e.g., image sensors that are 4096 pixels wide and 3072 pixels high or image sensors that are 4480 pixels wide and 2520 pixels high) or less than VGA resolution may be used, image sensor arrays in which the image sensors are not all identical may be used, etc.

Each image pixel array 17 may be provided with a color filter. The color filter may be a Bayer pattern color filter array or each image pixel array may be provided with a color filter of a single color. As examples, the color filters that may be used for the image sensor pixel arrays in the image sensors may be red filters, blue fitters, and green filters. Each filter may form a color filter layer that covers the image sensor pixel array of a respective image sensor in the array. Other filters such as infrared-blocking filters, filters that block visible light while passing infrared light, ultraviolet-light blocking filters, white color filters, etc. may also be used. In an array with numerous image sensors, some of the image sensors may have red filters, some may have blue color filters, some may have green color filers, some may have patterned color filters (e.g., Bayer pattern filters, etc.), some may have infrared-blocking filters, some may have ultraviolet light blocking filters, some may be visible-light-blocking-and-infrared-passing filters, etc.

Processing circuitry 18 (e.g., processing circuitry integrated onto sensor array integrated circuit 16 and/or processing circuitry on one or more associated integrated circuits) may be used to generate undistorted output images using image data captured by one or more of image pixel arrays 17.

Figure 2:
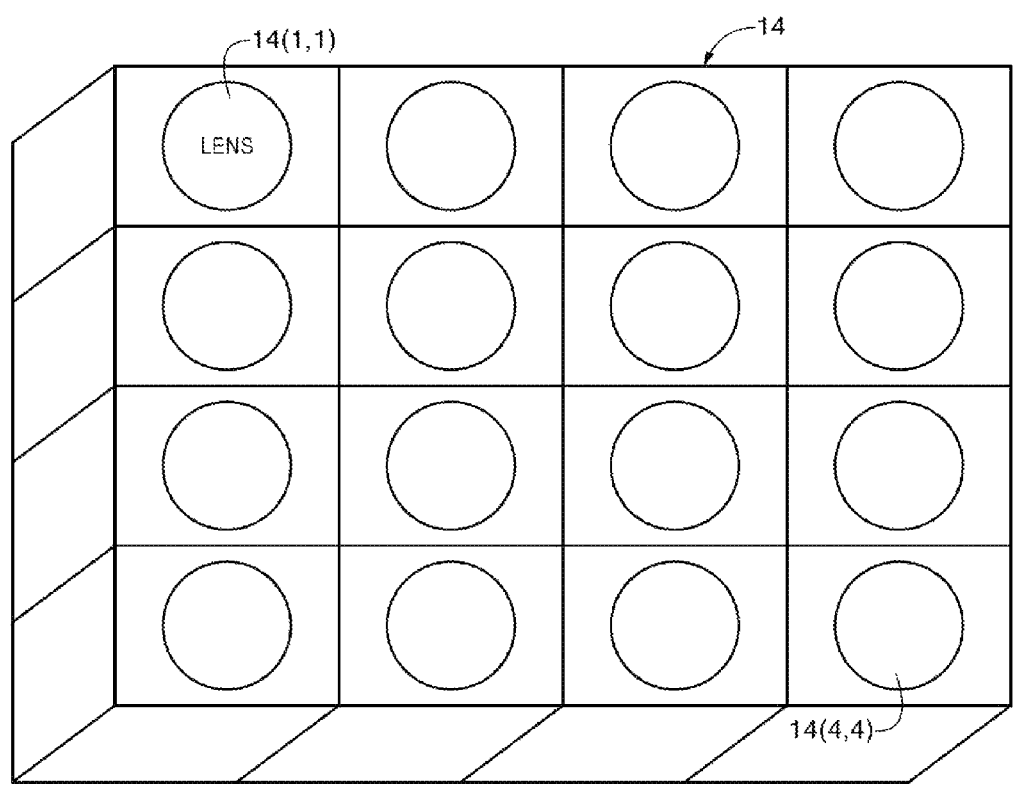
FIG. 2 is a perspective view of an illustrative camera module having an array of anamorphic lenses in accordance with an embodiment of the present invention.

FIG. 2 is a perspective view of an illustrative camera module having an array 14 of lenses (e.g., lenses such as anamorphic lenses 14(1,1), and 14(4,4)). The array of lenses may, for example, be a rectangular array having rows and columns of anamorphic lenses. The lenses may all be equally spaced from one another or may have different spacings. There may be any suitable number of lenses in the array. In the FIG. 2 example, there are four rows and four columns of lenses.

Figure 3:
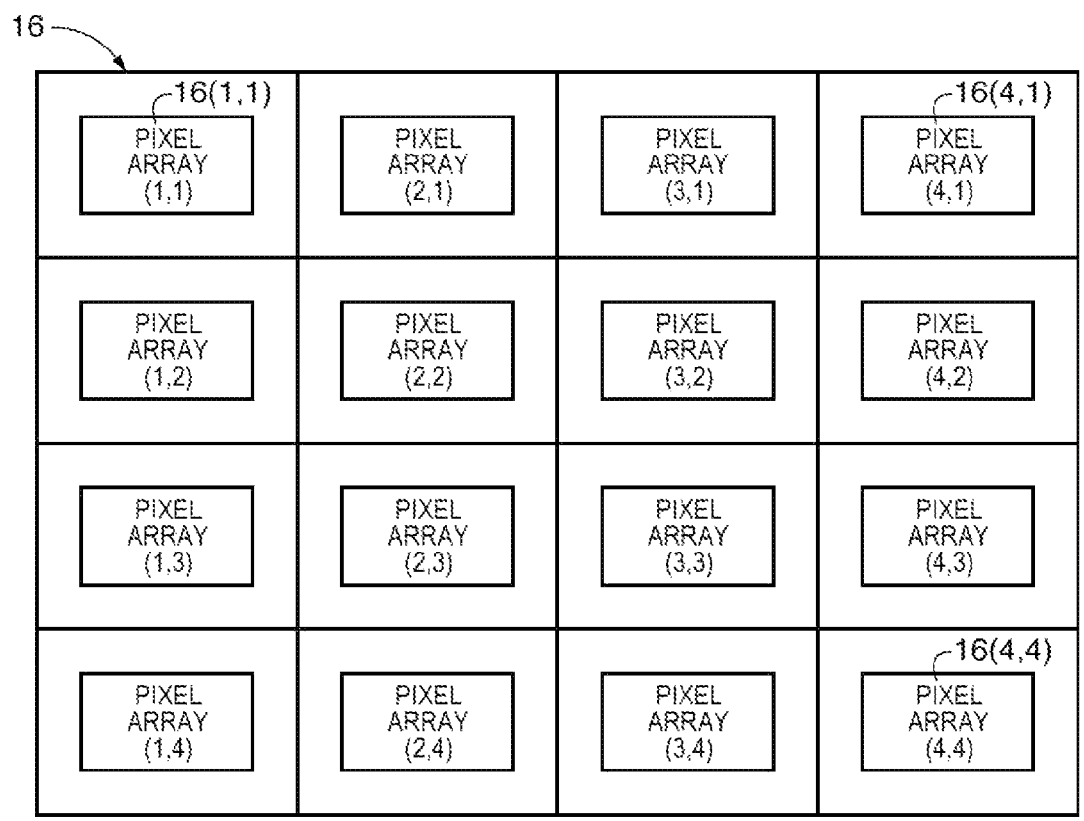
FIG. 3 is a diagram of an illustrative image sensor array of the type that may be used with the lens array of FIG. 2 in a camera module in accordance with an embodiment of the present invention.

An illustrative sensor array of the type that may be used with the lens area of FIG. 2 is shown in FIG. 3. As shown in FIG. 3 sensor array 16 may include image sensors such as sensor 16(1,1), 16(4,1), and 16(4,4). The array of FIG. 3 has sixteen image sensors, but, in general, array 16 may have any suitable number of image sensors (e.g., one image sensor, two or more sensors, four or more sensors, ten or more sensors, 20 or more sensors, etc.). Each image sensor may include one or more image pixel arrays 17 having asymmetrical image pixels 140. In one suitable example that is sometimes discussed herein as an example, camera module 12 may include one image sensor having one image pixel array and one corresponding anamorphic lens.

Figure 4:
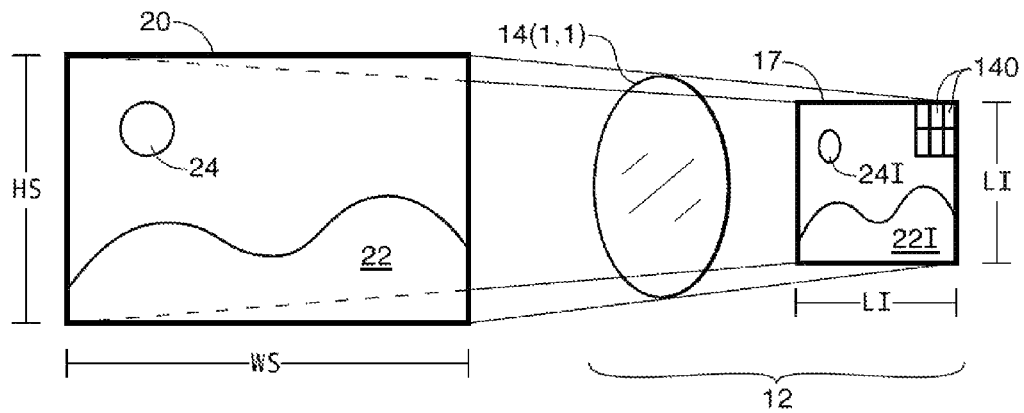
FIG. 4 is an illustrative diagram showing how an asymmetric image of a scene may be projected onto a square image pixel array having asymmetrical image pixels using an anamorphic lens in accordance with an embodiment of the present invention.

A diagram of a relatively wide image of a scene that is projected onto a square image pixel array having asymmetrical pixels is shown in FIG. 4. As shown in FIG. 4, the field-of-view of camera module 12 may include a real world scene 20. Real world scene 20 may include objects such as object 22 (e.g., a mountain) and object 24 (e.g., the moon). An anamorphic lens such as lens 14(1,1) may project scene 20 onto image pixel array 17 (e.g., image pixel array 17 of image sensor 16(1,1) having asymmetrical image pixels 140).

Scene 20 (e.g., the portion of the scene in the field-of-view of camera module 12) may have a width WS and a height HS. Width WH may be greater than height HS. As examples, width WS and height HS may have a 4:3 ratio (i.e., width WS may be fourth thirds of height HS) or width WS and height HS may have a 16:9 ratio (i.e., width WS may be sixteen ninths of height HS).

Anamorphic lens 14(1,1) may project a distorted image of scene 20 onto array 17. As shown in FIG. 4, the distorted image may be a horizontally compressed image that includes horizontally compressed object images such object images 22I and 24I (corresponding respectively to objects 22 and 24).

Image pixel array 17 may be a square image pixel array (e.g., image pixel array 17 may have a width and a height that are equal) having, sides of length LI. Image pixels 140 may be asymmetrical image pixels having a height that is larger than their width so that the portion of the scene that would have fallen in a square image pixel with a circular lens falls into a single asymmetrical image pixel 140 after passing through lens 14(1,1).

Figure 5:
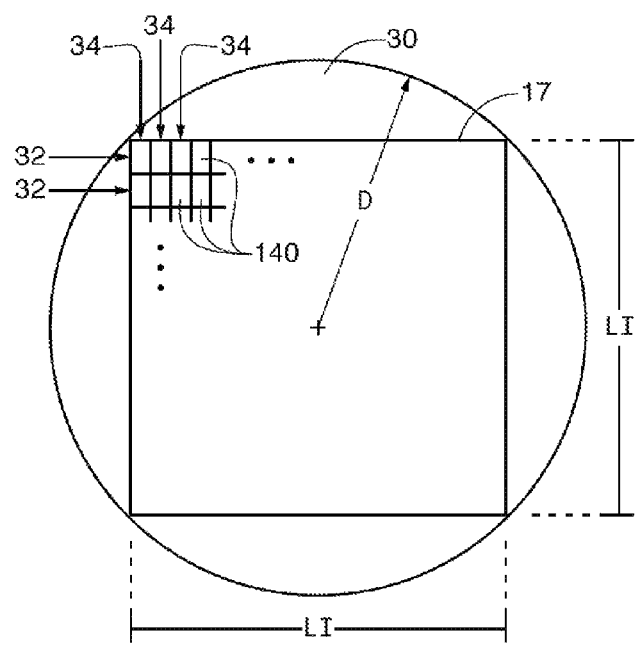
FIG. 5 is an illustrative diagram showing a square image pixel array having asymmetrical image pixels within an image circle of an anamorphic lens in accordance with an embodiment of the present invention.

As shown in FIG. 5, image circle 30 of an asymmetrical lens such as lens 14(1,1) may have a diameter D at the location of image pixel array 17. Diameter D may be large enough that the largest diagonal dimension of image pixel array 17 fits within circle 30. In this way, all image pixels 140 of image pixel array 17 can be illuminated by light from scene 20 that has passed through an asymmetrical lens such as lens 14(1,1).

The z-height of camera module 12 (e.g., height Z of FIG. 1) depends on the focal length of the lens used to project image light onto the image sensor as described by the following equation:

$$F = D/(2\tan(FOV/2)),$$

in which F is the focal length of the lens, D is the diameter of the image circle of the lens (as shown in FIG. 5), and FOV is the desired field-of-view of the particular application in which camera module 12 is to be implemented. The z-height of camera module 12 can therefore be reduced, independent of the desired field-of-view, by reducing the necessary image circle diameter D. An image sensor having an image pixel array with asymmetrical image pixels 140 can fit into a relatively smaller image circle (i.e., an image circle with a smaller diameter D) than a conventional image sensor with the same number of square image pixels.

As shown in FIG. 5, image pixels 140 may be arranged in pixel rows 32 and pixel columns 34. Image pixel array 17 may include more pixel columns 34 than pixel rows 32. As examples, image pixel array 17 may include 4096 pixel columns and 3072 pixel rows, 4480 pixel columns and 2520 pixel rows, other numbers of pixel columns and pixel rows having a ratio of 4 pixel columns for every three pixel rows other numbers of pixel columns and pixel rows having a ratio of sixteen pixel columns for every nine pixel rows or other suitable numbers of pixel columns and pixel rows. Each image pixel 140 may have a width that is less than its height so that image pixel array 17 has a square shape with sides of equal length LI while accommodating more pixel columns 34 than pixel rows 32.

Figure 6:
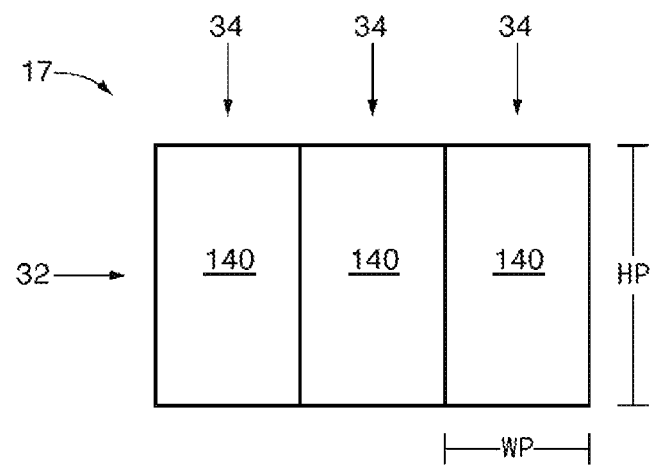
FIG. 6 is a top view of a portion of an illustrative image pixel array showing how image pixels in the image pixel array may have asymmetrical dimensions in accordance with an embodiment of the present invention.
Figure 7:
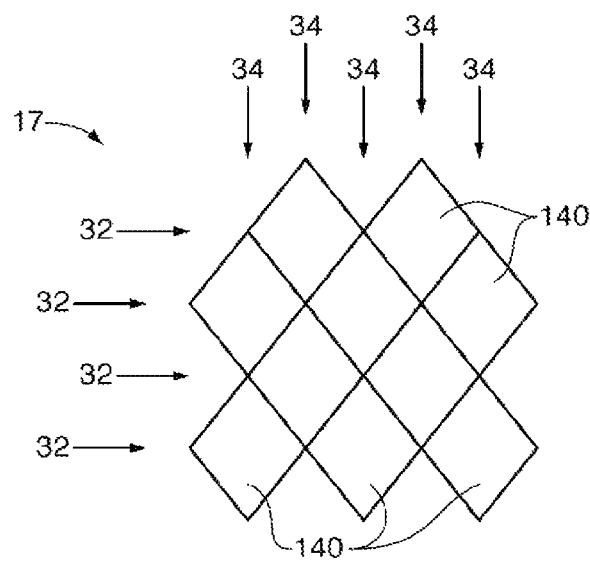
FIG. 7 is a top view of a portion of an illustrative image pixel array showing how diagonally oriented, diamond-shaped image pixels in the image pixel array may have asymmetrical dimensions in accordance with an embodiment of the present invention.

FIGS. 6 and 7 show examples of arrangements for asymmetrical image pixels 140. In the example of FIG. 6, pixels 140 are rectangular image pixels each having a width WP and a height HP. As shown in FIG. 6, width WP may be less than height HP. In configurations in which image pixel array 17 has four pixel columns 34 for every three pixel rows 32, width WP may be approximately 75% (e.g., between 70 percent and 80 percent or between 74 percent and 76 percent) of height HP. In this type of configuration, the image circle diameter D in which image pixel array 17 will fit is reduced in size by approximately 15.15% in comparison with conventional square pixels. However, this is merely illustrative.

In configurations in which image pixel array 17 has sixteen pixel columns for every nine pixel rows, width WP may be approximately 56.25% (e.g., between 50 percent and 60 percent or between 56 percent and 57 percent) of height HP. In this type of configuration, the image circle diameter D in which image pixel array 17 will fit is reduced in size by approximately 30.7% in comparison with conventional square pixels. However, configurations in which image pixels 140 are rectangular image pixels having edges that are aligned with edges of the image sensor are merely illustrative.

As shown in FIG. 7, image pixels 140 may have a substantially diamond shape in which the edges of image pixels 140 are not parallel to the edges of the image sensor (e.g., the edges of pixels 140 may be formed at an angle other than 180 degrees or 90 degrees with respect to the edge of the image sensor). In configurations in which image pixels 140 are diamond shaped image pixels and image pixel array 17 includes four pixel columns 34 for every three pixel rows 32, the image circle diameter D in which image pixel array 17 will fit is reduced in size by approximately 14.93% in comparison with conventional square pixels that are formed at an angle with respect to the edges of the image sensor. Image pixels of the types shown in FIGS. 6 and 7 may be front-side-illuminated (FSI) image pixels or back-side-illuminated (BSI) image pixels.

Figure 8:
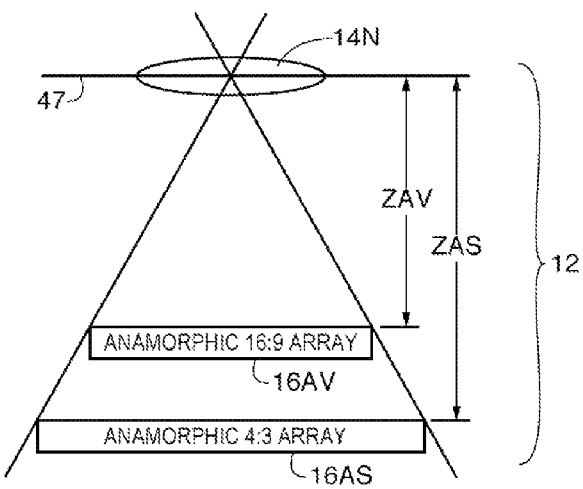
FIG. 8 is a cross-sectional side view of an illustrative camera module having an allomorphic lens and asymmetrical image pixels in accordance with an embodiment of the present invention.

As shown in FIG. 8, the z-height of a camera module 12 having anamorphic lenses and asymmetrical image pixels may be reduced by an amount that corresponds to the reduction in size of the image circle in comparison with conventional square image sensors. For example, camera module 12 may have an anamorphic lens 14N with a nodal point 47 formed at a z-distance ZAV from a video image sensor 16AV having asymmetrical image pixels. In configurations in which image sensor 16AV includes image pixels 140 having width WP that is approximately 56.25% of their height HP, ZAV may be reduced by approximately 30.7% in comparison with camera modules having circular lenses and square pixels.

As another example, camera module 12 may have an anamorphic lens 14N with a nodal point 47 that is formed at a z-distance ZAS from a still image sensor 16AS having asymmetrical image pixels. In configurations in which image sensor 16AS includes image pixels 140 having width WP that is approximately 75% of their height HP, ZAS may be reduced by approximately 15.15% in comparison with camera modules having circular lenses and square pixels. In configurations in which image sensor 16AS includes image pixels 140 having width WP that is approximately 56.25% of their height HP, ZAS may be reduced by approximately 30.7% in comparison with camera modules having circular lenses and square pixels. In configurations in which image sensor 16AS includes diamond shaped image pixels 140 of the type is shown in FIG. 7, ZAS may be reduced by approximately 14.93% in comparison with camera modules having circular lenses and square pixels with edges formed at an angle with respect to the edges of the image sensor.

Figure 9:
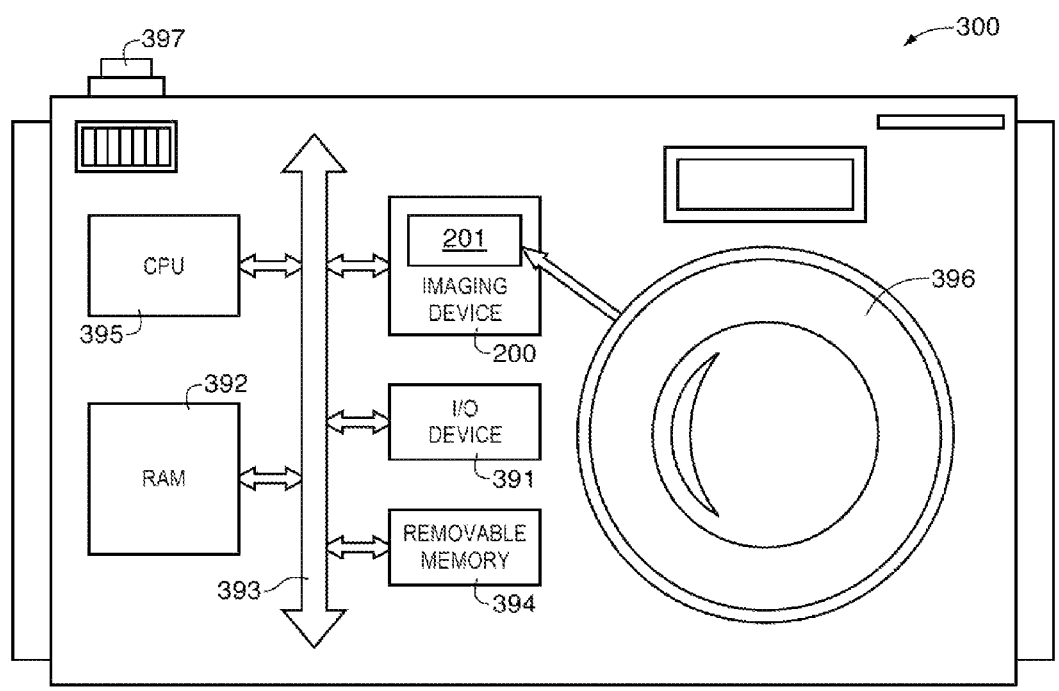
FIG. 9 is a block diagram of a processor system that may include a camera module of the type shown in FIG. 8 in accordance with an embodiment of the present invention.

FIG. 9 shows in simplified form a typical processor system 300, such as a digital camera, which includes an imaging device such as imaging device 200 (e.g., an imaging device 200 such as camera module 12 of FIG. 1 employing anamorphic lenses and asymmetrical image pixels as described in connection with FIGS. 1-8). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating camera modules having anamorphic lenses and asymmetrical image pixels. Camera modules having anamorphic lenses and asymmetrical image pixels may have reduced z-heights in comparison with camera modules having circular lenses and square pixel.

A camera module may include one or more anamorphic lenses that focus image light from a scene onto one or more corresponding image sensors with asymmetrical image pixels. The asymmetrical image pixels may have a shape that corresponds to distortion of the scene by the anamorphic lens. For example in configurations in which an anamorphic lens compresses the horizontal dimension of an image by 25%, the asymmetrical pixels may have a width that is 25% smaller than their height. In this way, image pixel values from the asymmetrical image pixels may be read out and processed as if they were square image pixels in order to reconstruct an undistorted image of a scene without the need for software-based distortion corrections.

An image sensor may include an image pixel array having pixel columns and pixel rows. The image pixel array may include more pixel columns that pixel rows. As examples, the image pixel array may be a square image pixel array that includes four pixel columns for every three pixel rows for still image capture operations or sixteen pixel columns for every nine pixel rows for video image capture operations. The image pixels may have a corresponding width to height ratio such as a 3:4 width to height ratio or a 9:16 width to height ratio so that the image pixel array can accommodate more pixel rows than pixel columns in a square array.

The foregoing is merely illustrative of the principles of this invention which can be practiced in other embodiments.

What is claimed is:

1. A camera module, comprising:
  an anamorphic lens having a corresponding image circle and a corresponding compression ratio; and
  an image sensor having a square image pixel array arranged in pixel columns and pixel rows, wherein the square image pixel array includes more pixel columns than pixel rows, wherein the square image pixel array is located entirely within the image circle of the anamorphic lens, and wherein the square image pixel array comprises:
    a plurality of rectangular image pixels having a height and a width, wherein a ratio of the height to the width is based on the compression ratio of the anamorphic lens, and wherein the ratio of the height to the width is between 0.7 and 0.8.

2. The camera module defined in claim 1 wherein the square image pixel array includes four pixel columns for every three pixel rows.

3. A camera module, comprising:
  an anamorphic lens; and
  an image sensor having an array of asymmetrical image pixels, wherein the anamorphic lens projects a distorted image onto the array of asymmetrical image pixels, wherein each asymmetrical image pixel has a shape that is based on distortion of the distorted image, wherein each asymmetrical image pixel has a width and a height, and wherein a ratio of the width of each asymmetrical image pixel to the height of that asymmetrical image pixel is between 0.5 and 0.6.

4. The camera module defined in claim 3 wherein the distorted image comprises a horizontally compressed image.

5. The camera module defined in claim 4 wherein each asymmetrical image pixel has a width and a height and wherein the width of each asymmetrical image pixel is smaller the height of that image pixel by an amount that corresponds to the distortion of the distorted image.

6. The camera module defined in claim 3, further comprising processing circuitry configured to generate an undistorted image using image signals from the asymmetrical image pixels.

7. The camera module defined in claim 3 wherein the image sensor is a video image sensor.

8. The camera module defined in claim 3 wherein the image sensor is a still image sensor.

9. The camera module defined in claim 3, further comprising:
  an additional anamorphic lens; and
  an additional image sensor having an additional array of asymmetrical image pixels, wherein the additional anamorphic lens projects an additional distorted image onto the additional array of asymmetrical image pixels.

10. A system, comprising:
  a central processing unit;
  memory;
  input-output circuitry; and
  an imaging device, wherein the imaging device comprises:
    an anamorphic lens, and
    an image sensor having an array of asymmetrical image pixels, wherein the anamorphic lens projects a distorted image onto the array of asymmetrical image pixels, wherein each asymmetrical image pixel has a width and a height, and wherein the width of each asymmetrical image pixel is smaller than the height of that image pixel by an amount proportional to a distortion of the distorted image by the anamorphic lens, and wherein a ratio of the width of each asymmetrical image pixel to the height of each asymmetrical image pixel is between 0.5 and 0.6.

11. The system defined in claim 10 wherein the anamorphic lens has a corresponding image circle, wherein the array of asymmetrical image pixels is a square array of asymmetrical image pixels having pixel rows and pixel columns, and wherein the square array of asymmetrical image pixels is located within the image circle of the anamorphic lens.

12. The system defined in claim 11 wherein the square array of asymmetrical image pixels includes more pixel columns than pixel rows.

13. The camera module defined in claim 1, wherein the ratio of the height to the width is equal to the compression ratio of the anamorphic lens.

* * * * *